US012450690B2

(12) United States Patent
Liu et al.

(10) Patent No.: US 12,450,690 B2
(45) Date of Patent: Oct. 21, 2025

(54) METHOD, DEVICE, AND COMPUTER PROGRAM PRODUCT FOR IMAGE PROCESSING

(71) Applicant: Dell Products L.P., Round Rock, TX (US)

(72) Inventors: Zhisong Liu, Shenzhen (CN); Zijia Wang, WeiFang (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 429 days.

(21) Appl. No.: 17/987,491

(22) Filed: Nov. 15, 2022

(65) Prior Publication Data

US 2024/0135489 A1    Apr. 25, 2024
US 2024/0233073 A9    Jul. 11, 2024

(30) Foreign Application Priority Data

Oct. 21, 2022   (CN) .......................... 202211298887.8

(51) Int. Cl.
*G06K 9/00*    (2022.01)
*G06N 3/08*    (2023.01)
(Continued)

(52) U.S. Cl.
CPC ............. *G06T 3/4046* (2013.01); *G06N 3/08* (2013.01); *G06T 3/4053* (2013.01)

(58) Field of Classification Search
None
See application file for complete search history.

(56) References Cited

U.S. PATENT DOCUMENTS 11,010,871 B1 * 5/2021 Lee ...................... G06T 3/4046
11,983,239 B2 * 5/2024 Lian ...................... G06V 10/82
(Continued)

FOREIGN PATENT DOCUMENTS

CN    109741260 A  *  5/2019
CN    110276721 A  *  9/2019  ........... G06T 11/003
(Continued)

OTHER PUBLICATIONS

CN-109741260-A (machine translation) (Year: 2019).*
(Continued)

*Primary Examiner* — Feng Niu
(74) *Attorney, Agent, or Firm* — Ryan, Mason & Lewis, LLP

(57) ABSTRACT

A method includes generating a feature map of a second resolution for an input image of a first resolution, the first resolution being less than the second resolution. The method further includes generating a feature map of the second resolution and a feature map of the first resolution through a first residual-based dense back projection (RDBP) network. In addition, the method further includes generating a feature map of the second resolution and a feature map of the first resolution through a second RDBP network, the first RDBP network and the second RDBP network respectively including a downsampling back projection layer, an upsampling back projection layer, and an attention layer. The method further includes generating an output image of the second resolution based on the feature maps of the second resolution and the feature maps of the first resolution generated through the first RDBP network and the second RDBP network.

20 Claims, 11 Drawing Sheets

(51) Int. Cl.
    *G06T 3/4046* (2024.01)
    *G06T 3/4053* (2024.01)

(56) References Cited

U.S. PATENT DOCUMENTS

| | | | | |
|---|---|---|---|---|
| 12,190,520 | B2 * | 1/2025 | Nie | G06V 10/82 |
| 12,212,764 | B2 * | 1/2025 | Gao | H04N 19/42 |
| 12,313,732 | B2 * | 5/2025 | Chen | G06V 10/7715 |
| 2021/0133925 | A1 * | 5/2021 | Lee | G06T 3/4046 |
| 2022/0286696 | A1 * | 9/2022 | Gao | H04N 19/147 |
| 2022/0391635 | A1 * | 12/2022 | Lian | G06N 3/045 |
| 2022/0391636 | A1 * | 12/2022 | Lian | G06N 3/044 |
| 2023/0184927 | A1 * | 6/2023 | Chen | G06V 10/25 342/25 R |
| 2023/0196745 | A1 * | 6/2023 | Hur | G06V 10/82 382/156 |
| 2023/0400301 | A1 * | 12/2023 | Song | G01W 1/10 |
| 2024/0013399 | A1 * | 1/2024 | Nie | G06V 20/70 |

FOREIGN PATENT DOCUMENTS

| | | | | |
|---|---|---|---|---|
| CN | 111192200 A * | 5/2020 | | G06T 3/4046 |
| CN | 111353940 A * | 6/2020 | | G06N 3/045 |
| CN | 112699848 A * | 4/2021 | | G06F 18/253 |
| CN | 115063435 A * | 9/2022 | | G06N 3/08 |
| WO | WO-2021104060 A1 * | 6/2021 | | G06T 7/10 |

OTHER PUBLICATIONS

WO-2021104060-A1 (machine translation) (Year: 2021).*
Xu et al., "Sparse cross-scale attention network for efficient lidar panoptic segmentation." In Proceedings of the AAAI Conference on Artificial Intelligence, vol. 36, No. 3, pp. 2920-2928. 2022. (Year: 2022).*
Deng et al., "Cross-scale attention guided multi-instance learning for Crohn's disease diagnosis with pathological images." In International workshop on multiscale multimodal medical imaging, pp. 24-33. Cham: Springer Nature Switzerland, 2022. (Year: 2022).*
Mei et al., "Image super-resolution with cross-scale non-local attention and exhaustive self-exemplars mining." In Proceedings of the IEEE/CVF conference on computer vision and pattern recognition, pp. 5690-5699. 2020. (Year: 2020).*
CN-110276721-A (machine translation) (Year: 2019).*
CN-111192200-A (machine translation) (Year: 2020).*
CN-111353940-A (machine translation) (Year: 2020).*
CN-112699848-A (machine translation) (Year: 2021).*
CN-115063435-A (machine translation) (Year: 2022).*
Xu et al., "Spatial—spectral FFPNet: Attention-Based Pyramid Network for Segmentation and Classification of Remote Sensing Images." arXiv preprint arXiv:2008.08775 (2020). (Year: 2020).*
Deng et al., "Cross-scale Attention Guided Multi-instance Learning for Crohn's Disease Diagnosis with Pathological Images." arXiv preprint arXiv:2208.07322 (2022). (Year: 2022).*
Nie et al., "Pyramid Architecture for Multi-Scale Processing in Point Cloud Segmentation," 2022 IEEE/CVF Conference on Computer Vision and Pattern Recognition (CVPR), New Orleans, LA, USA, 2022, pp. 17263-17273 (Year: 2022).*
Han et al., "3CROSSNet: Cross-Level Cross-Scale Cross-Attention Network for Point Cloud Representation," in IEEE Robotics and Automation Letters, vol. 7, No. 2, pp. 3718-3725, Apr. 2022 (Year: 2022).*
Ni et al., "Dual Path Cross-Scale Attention Network for Image Inpainting," 2022 IEEE International Conference on Image Processing (ICIP), Bordeaux, France, 2022, pp. 4223-4227 (Year: 2022).*
Lin et al., "BATFormer: Towards Boundary-Aware Lightweight Transformer for Efficient Medical Image Segmentation." arXiv preprint arXiv:2206.14409 (2022). (Year: 2022).*
He et al., "ForkNet: Strong Semantic Feature Representation and Subregion Supervision for Accurate Remote Sensing Change Detection," in IEEE Journal of Selected Topics in Applied Earth Observations and Remote Sensing, vol. 15, pp. 2142-2153, 2022, doi: 10.1109/JSTARS.2022.3152775. (Year: 2022).*
Qiu et al., "IVT: An End-to-End Instance-guided Video Transformer for 3D Pose Estimation." arXiv preprint arXiv:2208.03431 (2022). (Year: 2022).*
Lu et al., "Cross-scale attention model for acoustic event classification." arXiv preprint arXiv:1912.12011v2 (2020). (Year: 2020).*
Bashir et al. "A comprehensive review of deep learning-based single image super-resolution." PeerJ Comput Sci. Jul. 13, 2021;7:e621. doi: 10.7717/peerj-cs.621. PMID: 34322592; PMCID: PMC8293932. (Year: 2021).*
Wang et al., "Deep learning for image super-resolution: A survey." IEEE transactions on pattern analysis and machine intelligence 43, No. 10 (2020): 3365-3387. (Year: 2020).*
Michelini et al., "Multi-Grid Back-Projection Networks," in IEEE Journal of Selected Topics in Signal Processing, vol. 15, No. 2, pp. 279-294, Feb. 2021 (Year: 2021).*
Pan et al., "Super-Resolution of Single Remote Sensing Image Based on Residual Dense Backprojection Networks," in IEEE Transactions on Geoscience and Remote Sensing, vol. 57, No. 10, pp. 7918-7933, Oct. 2019 (Year: 2019).*
Y. Mei et al., "Pyramid Attention Networks for Image Restoration," arXiv:2004.13824v4, Jun. 3, 2020, 19 pages.
J. Kim et al., "Accurate Image Super-Resolution Using Very Deep Convolutional Networks," IEEE Conference on Computer Vision and Pattern Recognition (CVPR), arXiv:1511.04587v2, Nov. 11, 2016, 9 pages.
W.-S. Lai et al., "Deep Laplacian Pyramid Networks for Fast and Accurate Super-Resolution," IEEE Conference on Computer Vision and Pattern Recognition (CVPR), arXiv:1704.03915v2, Oct. 9, 2017, 9 pages.
A. Vaswani et al., "Attention Is All You Need," Advances in Neural Information Processing Systems, arXiv:1706.03762v5, Dec. 6, 2017, 15 pages.
B. Lim et al., "Enhanced Deep Residual Networks for Single Image Super-Resolution," IEEE Conference on Computer Vision and Pattern Recognition (CVPR), arXiv:1707.02921v1, Jul. 10, 2017, 9 pages.
Y. Zhang et al., "Image Super-Resolution Using Very Deep Residual Channel Attention Networks," European Conference on Computer Vision, arXiv:1807.02758v2, Jul. 12, 2018, 16 pages.
A. Buades et al., "A Non-local Algorithm for Image Denoising," 2005 IEEE Computer Society Conference on Computer Vision and Pattern Recognition (CVPR'05), vol. 2, Jun. 2005, pp. 60-65.
M. Haris et al., "Deep Back-Projection Networks for Single Image Super-resolution," IEEE Transactions on Pattern Analysis and Machine Intelligence, arXiv:1904.05677v2, Jun. 13, 2020, 14 pages.
Z.-S. Liu et al., "Hierarchical Back Projection Network for Image Super-Resolution," IEEE/CVF Conference on Computer Vision and Pattern Recognition, arXiv:1906.06874v2, Jun. 20, 2019, 10 pages.
Z.- S. Liu et al., "Image Super-Resolution via Attention based Back Projection Networks," IEEE/CVF Conference on Computer Vision and Pattern Recognition, arXiv:1910.04476v, Oct. 10, 2019, 9 pages.
T. Dai et al., "Second-order Attention Network for Single Image Super-Resolution," Proceedings of the IEEE Conference on Computer Vision and Pattern Recognition, Jun. 1, 2019, 10 pages.
N. Parmar et al, "Image Transformer," International Conference on Machine Learning, arXiv:1802.05751v3, Jun. 15, 2018, 10 pages.
X. Wang et al., "Non-local Neural Networks," Conference on Computer Vision and Pattern Recognition, arXiv:1711.07971v3, Apr. 13, 2018, 10 pages.

* cited by examiner

METHOD, DEVICE, AND COMPUTER PROGRAM PRODUCT FOR IMAGE PROCESSING

RELATED APPLICATION

The present application claims priority to Chinese Patent Application No. 202211298887.8, filed Oct. 21, 2022, and entitled "Method, Device, and Computer Program Product for Image Processing," which is incorporated by reference herein in its entirety.

FIELD

Embodiments of the present disclosure relate mainly to the field of image processing, and more particularly, to the field of image super-resolution.

BACKGROUND

Image super-resolution is a basic research topic in image processing. Image super-resolution typically involves generating, from a given low resolution image, a high resolution image by predicting missing high frequency information. Image super-resolution has been studied for many years in the field of image processing, and may be used for data compression, data transmission, and data conversion.

With the development of artificial intelligence technology, deep neural network technology has gradually become a common means to achieve image super-resolution. A deep neural network has a substantial data mining capability, which makes image super-resolution methods that use a deep neural network more effective than image super-resolution methods that do not use a deep neural network. However, when deep neural network technology is used for image super-resolution, some problems related to network performance and the quality of generated images may arise.

SUMMARY

A solution for image processing is provided according to embodiments of the present disclosure.

In a first aspect of the present disclosure, a method for image processing is provided. The method includes: generating a feature map of a second resolution for an input image of a first resolution, the first resolution being less than the second resolution; generating a feature map of the second resolution and a feature map of the first resolution through a first residual-based dense back projection (RDBP) network; generating a feature map of the second resolution and a feature map of the first resolution through a second RDBP network, the first RDBP network and the second RDBP network respectively including a downsampling back projection layer, an upsampling back projection layer, and an attention layer; and generating an output image of the second resolution based on the feature maps of the second resolution and the feature maps of the first resolution generated through the first RDBP network and the second RDBP network.

In a second aspect of the present disclosure, an electronic device is provided. The electronic device includes at least one processor, and a memory coupled to the at least one processor and having instructions stored thereon, wherein the instructions, when executed by the at least one processor, cause the electronic device to perform the method according to the first aspect of the present disclosure.

In a third aspect of the present disclosure, a computer program product that is tangibly stored on a non-transitory computer-readable medium is provided. The computer program product comprises machine-executable instructions, wherein the machine-executable instructions, when executed by a machine, cause the machine to perform the method according to the first aspect of the present disclosure.

It should be understood that the content described in this Summary is neither intended to limit key or essential features of embodiments of the present disclosure, nor intended to limit the scope of the present disclosure. Other features of the present disclosure will become readily understood from the description below.

BRIEF DESCRIPTION OF THE DRAWINGS

The above and other features, advantages, and aspects of embodiments of the present disclosure will become more apparent with reference to the accompanying drawings and the following Detailed Description. In the accompanying drawings, identical or similar reference numerals represent identical or similar elements, in which.

DETAILED DESCRIPTION

Figure 1:
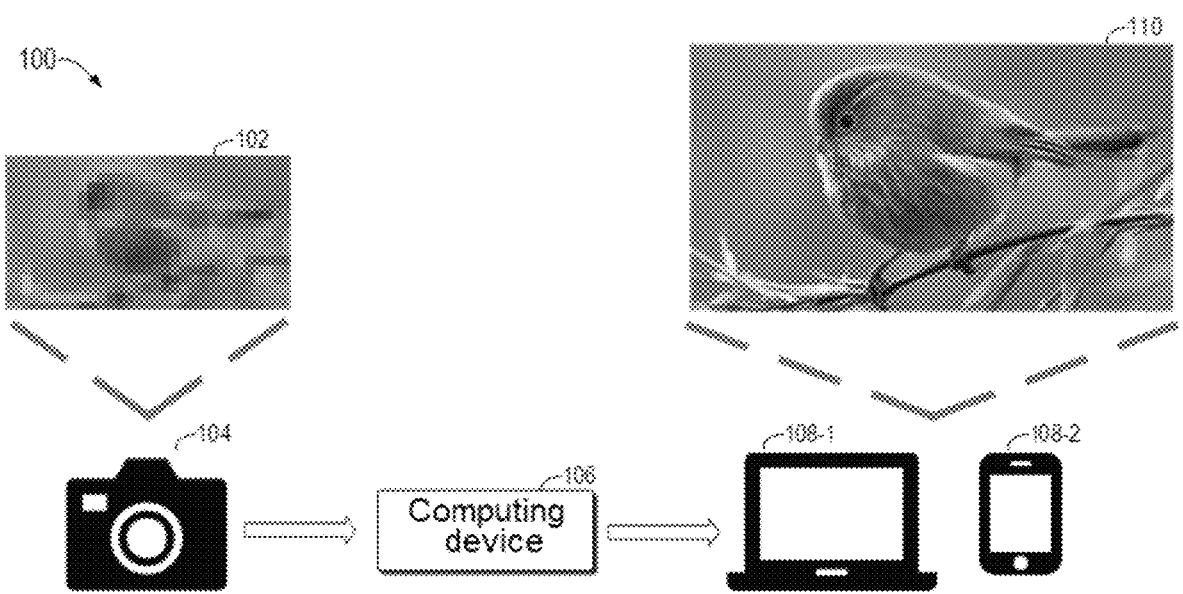
FIG. 1 is a schematic diagram of an example environment in which a plurality of embodiments of the present disclosure can be implemented.

In order to generate a high quality and high resolution image through a deep neural network, a neural network with a very deep depth is required, which may lead to high running time complexity for an algorithm, making it impossible to be widely used. In addition, a very deep network depth is prone to cause a problem of gradient disappearance, making it impossible to generate an image with higher quality. Conversely, if an existing algorithm with low time complexity is used for image modeling, a recovered high resolution image brings an unsatisfactory effect.

Illustrative embodiments of the present disclosure will be described in more detail below with reference to the accompanying drawings. Although the accompanying drawings show some embodiments of the present disclosure, it should be understood that the present disclosure can be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

As described above, in order to generate a high quality and high resolution image through a deep neural network, a neural network with a very deep depth is required, which may lead to high running time complexity for an algorithm, making it impossible to be widely used. Conversely, if an existing algorithm with low time complexity is used for image modeling, a recovered high resolution image brings an unsatisfactory effect.

A solution for image processing is provided according to various embodiments of the present disclosure. In embodiments of the present disclosure, the solution comprises: generating a feature map of a second resolution for an input image of a first resolution, the first resolution being less than the second resolution; generating a feature map of the second resolution and a feature map of the first resolution through a first RDBP network; generating a feature map of the second resolution and a feature map of the first resolution through a second RDBP network, the first RDBP network and the second RDBP network respectively including a downsampling back projection layer, an upsampling back projection layer, and an attention layer; and generating an output image of the second resolution based on the feature maps of the second resolution and the feature maps of the first resolution generated through the first RDBP network and the second RDBP network. According to the solution in embodiments of the present disclosure, associations between a plurality of pixel blocks in an image and associations between pixels within a pixel block can be determined by making full use of an attention mechanism. In addition, according to the solution in embodiments of the present disclosure, deeper and wider connections between feature maps can be established by making full use of a back projection mechanism, so as to share feature information between the feature maps. In this way, time complexity of the algorithm is reduced, and the quality of the generated high resolution image is improved, so that it can be more widely used in various fields.

Embodiments of the present disclosure will be specifically described below with reference to the accompanying drawings.

FIG. 1 is a schematic diagram of example environment 100 in which a plurality of embodiments of the present disclosure can be implemented. In environment 100, a user captures low resolution image 102 with camera 104. Low resolution image 102 has relatively low resolution compared with high resolution processed image 110. The low resolution of the image may be due to the following reasons: the camera has poor performance, a photographed object is moving, a hand holding the camera is shaking, and the like. Low resolution image 102 may be provided to computing device 106 to perform image processing. Computing device 106 generates high resolution processed image 110 based on low resolution image 102. Then, computing device 106 transmits the high resolution image to electronic device 108-1 and/or 108-2 (collectively referred to as or individually referred to as electronic device 108) to display the high resolution image to the user.

Computing device 106 may be any device with a computing capability. Some examples of computing device 106 include, but are not limited to, a personal computer, a desktop computer, a portable computer, a server, a cloud-based server, a service node, an edge computing node, and the like. Although illustrated as a separate device, in some embodiments, computing device 106 may be integrated in electronic device 108. In some other embodiments, computing device 106 may be a remote computing device (for example, a remote computing node) of electronic device 108.

In some embodiments, low resolution image 102 is not captured in real time by using camera 104, but has already been stored on a storage medium. Computing device 106 may read low resolution image 102 from the storage medium on which the low resolution image is stored, and then perform image processing.

Figure 2:
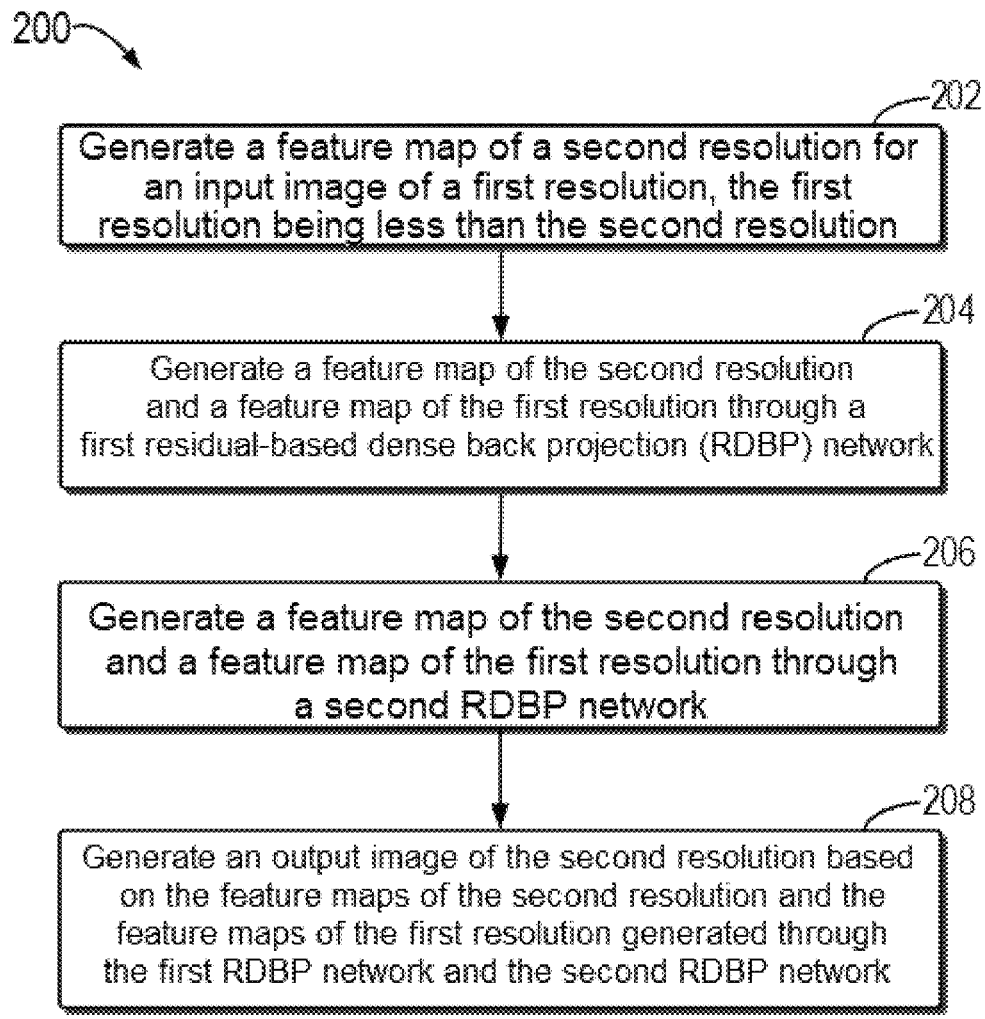
FIG. 2 is a flow chart of a method for image processing according to some embodiments of the present disclosure.

A process of image processing according to embodiments of the present disclosure will be described below with reference to FIG. 2 to FIG. 5C. FIG. 2 is a flow chart of a method for image processing according to some embodiments of the present disclosure. Method 200 may be performed by computing device 106 shown in FIG. 1.

Figure 3A:
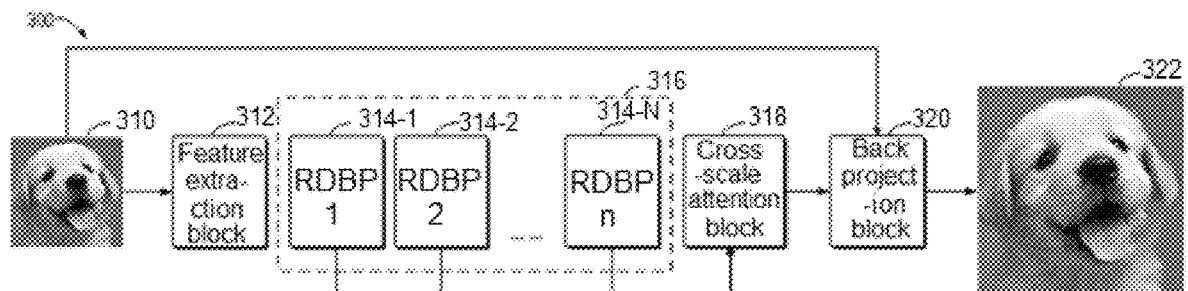
FIGS. 3A, 3B, 3C and 3D are schematic diagrams of a method for image processing according to some embodiments of the present disclosure and are schematic diagrams of a partial structure described in detail.

As shown in FIG. 2, at block 202, a feature map of a second resolution for an input image of a first resolution is generated, the first resolution being less than the second resolution. For example, a low resolution input image is given, and a high resolution feature map for the low resolution input image is generated. A specific process of block 202 will be described below with reference to FIG. 3A and FIG. 3B. FIG. 3A is a schematic structural block diagram of a method 300 for image processing according to some embodiments of the present disclosure. In FIG. 3A, feature extraction block 312 may be configured to implement block 202 in FIG. 2. In some embodiments, computing device 106 receives a low resolution image captured by camera 104, such as low resolution image 310. Feature extraction block 312 receives low resolution image 310, and then obtains a high resolution feature map through feature extraction.

Figure 3B:
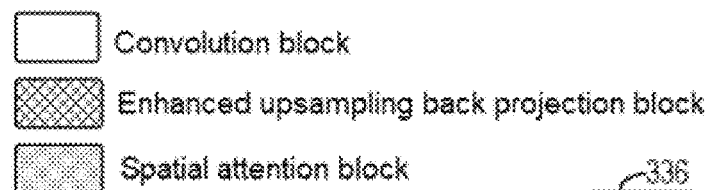
Figure 3B:
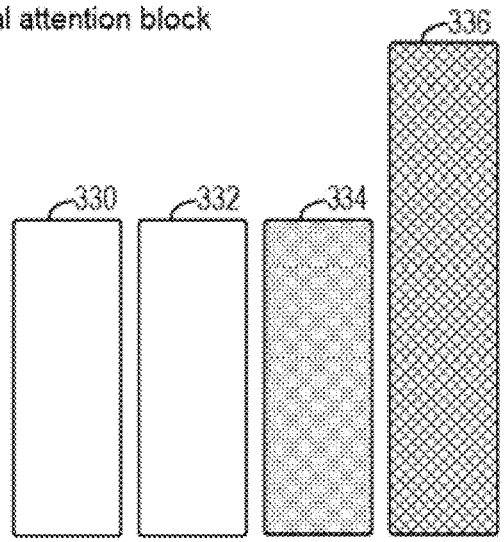
Figure 3C:
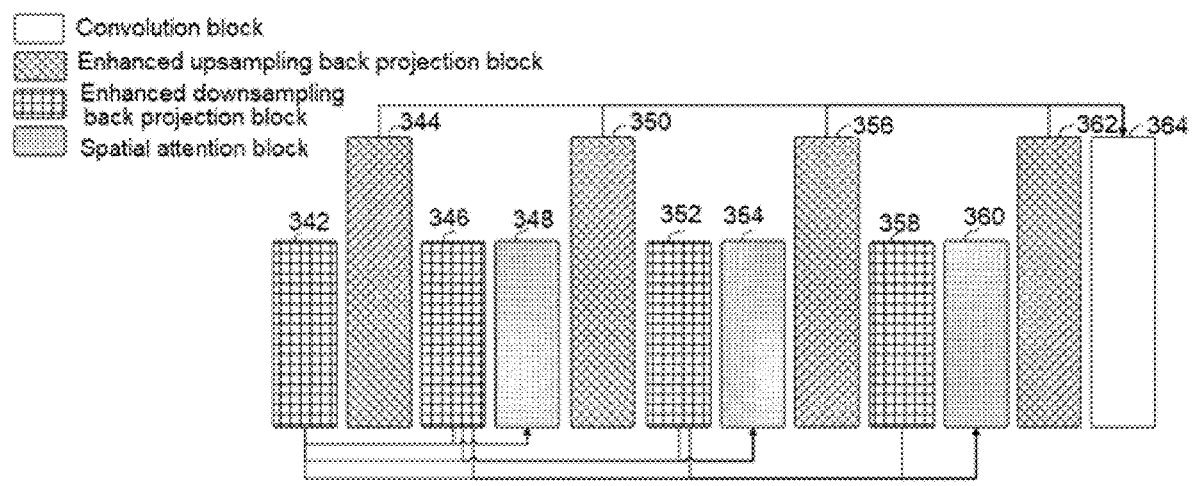
Figure 3D:
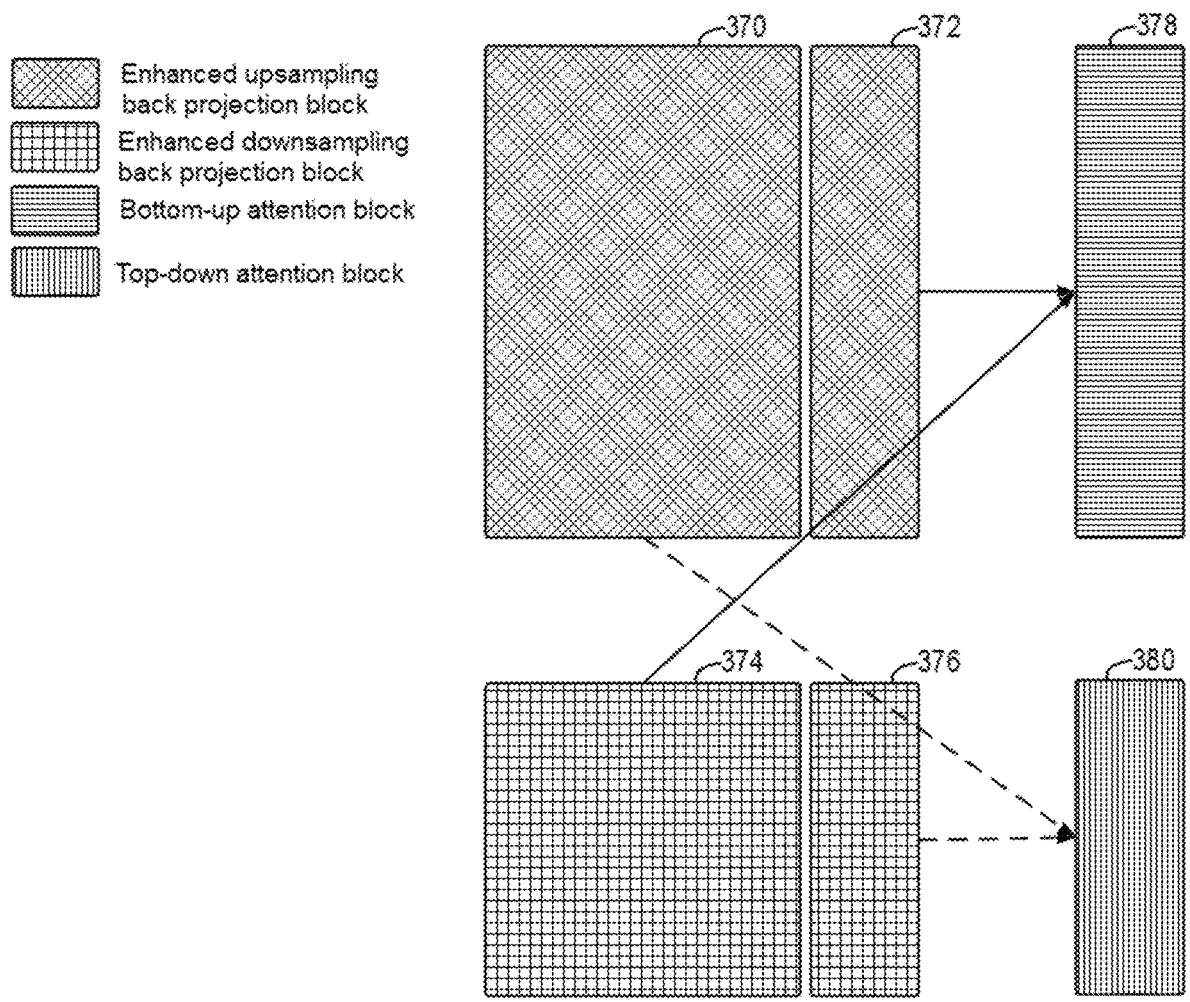

FIG. 3B to FIG. 3D depict schematic diagrams of a partial structure of FIG. 3A in detail. In FIG. 3B to FIG. 3D, some blocks are lower, while some blocks are higher. For ease of understanding, in the method according to this embodiment of the present disclosure, a block is lower if a low resolution feature map can be obtained after passing through the block, and a block is higher if a high resolution feature map can be obtained after passing through the block.

FIG. 3B is a schematic diagram of an internal algorithm structure of a feature extraction block. As shown in FIG. 3B, low resolution image 310 goes through convolution block 330, convolution block 332, spatial attention block 334, and enhanced upsampling back projection block 336 sequentially. In this process, a low resolution feature map is extracted by performing convolving and weighting (i.e., through spatial attention block 334) on low resolution image 310, and the low resolution feature map is upsampled to obtain a high resolution feature map for low resolution image 310.

Referring back to FIG. 2, at block 204, a feature map of the second resolution and a feature map of the first resolution are generated through a first RDBP network. For example, computing device 106 generates a high resolution feature map and a low resolution feature map through an RDBP network. For example, in FIG. 3A, RDBP network 314-1 generates a new high resolution feature map and a new low resolution feature map based on the high resolution feature map received from feature extraction block 312. Specifically, the RDBP network includes an upsampling block, a downsampling block, an attention block, and a convolution block. The upsampling block generates a high resolution feature map based on the low resolution feature map. The downsampling block generates a low resolution feature map based on the high resolution feature map. The attention block performs weighting on the feature map to generate an adjusted feature map. In some embodiments, a back projection mechanism may be used in the upsampling block. Such an upsampling block is herein referred to as an enhanced upsampling back projection block. Similarly, a back projection mechanism may be used in the downsampling block. Such a downsampling block is herein referred to as an enhanced downsampling back projection block. The attention block may be a spatial attention block, a channel attention block, and a spatial channel attention block.

FIG. 3C is a schematic diagram of an internal algorithm structure in an RDBP network, in which an enhanced upsampling back projection block, an enhanced downsampling back projection block, a spatial attention block, and a convolution block are included. A high resolution feature map inputted to the RDBP network is downsampled (that is, enhanced downsampling back projection block 342) to obtain an initial downsampled feature map. The initial downsampled feature map is upsampled (that is, enhanced upsampling back projection block 344) and downsampled (that is, enhanced downsampling back projection block 346) to generate a first upsampled feature map and a first downsampled feature map. Weighting is performed on the initial downsampled feature map and the first downsampled feature map (that is, spatial attention block 348) to generate a first adjusted feature map. The first adjusted feature map is upsampled (that is, enhanced upsampling back projection block 350) and downsampled (that is, enhanced downsampling back projection block 352) to generate a second upsampled feature map and a second downsampled feature map. Weighting is performed on the initial downsampled feature map, the first downsampled feature map, and the second downsampled feature map (that is, spatial attention block 354) to generate a second adjusted feature map. The second adjusted feature map is upsampled (that is, enhanced upsampling back projection block 362) to generate a third upsampled feature map. In some embodiments, in this case, the first upsampled feature map, the second upsampled feature map, and the third upsampled feature map may be convolved (a convolution block similar to convolution block 364) to generate an attention-adjusted feature map. Then, the attention-adjusted feature map is determined to be the feature map of the second resolution, and the second adjusted feature map is determined to be the feature map of the first resolution.

In addition, in some other embodiments, a process of generating the second adjusted feature map may be iteratively performed prior to the generation of the third upsampled feature map. For example, in FIG. 3C, processes of upsampling, downsampling and weighting (that is, enhanced upsampling back projection block 356, enhanced downsampling back projection block 358, and spatial attention block 360) are repeated again before enhanced upsampling back projection block 362. In this case, the final spatial attention block (that is, spatial attention block 360) generates an adjusted feature map based on downsampled feature maps generated by all the previous enhanced downsampling back projection blocks, and the adjusted feature map will be determined to be the feature map of the first resolution. Convolution block 364 generates an adjusted feature map based on upsampled feature maps generated by all the previous enhanced upsampling back projection blocks, and the adjusted feature map will be determined to be the feature map of the second resolution.

The above process is a process of back projection. After the low resolution feature map is enlarged to the high resolution feature map by upsampling, the high resolution feature map is back projected by downsampling to generate a new low resolution feature map. Generally, an error exists between the new low resolution feature map and an initial low resolution feature map. The error is also referred to as fidelity. For fidelity, the process of back projection is described from another perspective through the following Equation (1):

$$\hat{H}_{t+1}=\hat{H}_t+\lambda D^{-1}(D\hat{H}_t-L) \quad (1)$$

where L denotes a low resolution feature map, $\hat{H}$ denotes an enlarged high resolution feature map, D denotes a downsampling operation process, $D^{-1}$ denotes an upsampling operator, $\lambda$ denotes a learning parameter used to control proportions of residuals that may be used to generate a high resolution feature map, and t denotes the number of iterations.

In order to automatically learn the learning parameter and the upsampling operator, an enhanced back projection model is used herein. The entire process includes an enhanced downsampling back projection block and an enhanced upsampling back projection block. The enhanced downsampling back projection block is considered to adjust back projection of residuals between an initial low resolution feature map and a downsampled feature map. In order to share information, dense connections are added between upsampling blocks and downsampling blocks, so a recognition capability of the network can be improved.

For example, in some embodiments, there is a need to enlarge a low resolution image of 64×64 pixels to a high resolution image of 128×128 pixels. After an initial image of 64×64 pixels is enlarged to an image of 128×128 pixels by upsampling, an error definitely exists between this image and a real image of 128×128 pixels. In order to calculate the error, the 128×128 pixels obtained by enlargement are then downsampled to obtain a downsampled image of 64×64 pixels. The error is obtained by subtracting the initial image of 64×64 pixels from the downsampled image of 64×64 pixels. The error is then upsampled and enlarged to a scale of 128×128 pixels, and then is added with an initial upsampled image of 128×128 pixels, so that the error can be made up for.

Figure 4A:
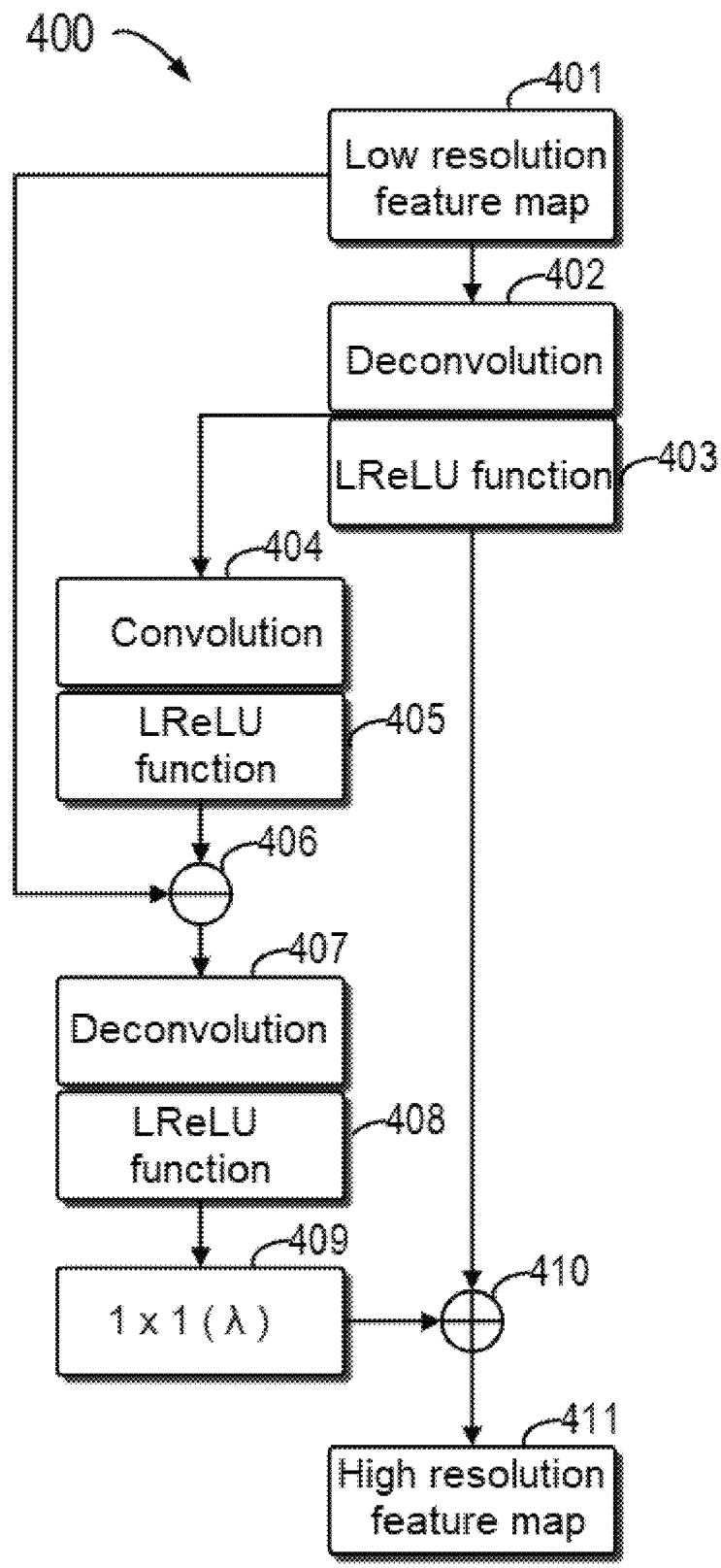
FIGS. 4A and 4B are diagrams of schematic algorithm structures of an enhanced upsampling back projection block and an enhanced downsampling back projection block according to some embodiments of the present disclosure.

FIG. 4A is a diagram 400 of a schematic algorithm structure of an enhanced upsampling back projection block according to some embodiments of the present disclosure. As shown in FIG. 4A, the enhanced upsampling back projection block receives low resolution feature map 401 (for example, the resolution is 64×64 pixels). After going through deconvolutional network 402 and activation function 403 (for example, an LReLU function, where LReLU denotes a leaky rectified linear unit activation function), low resolution feature map 401 is enlarged and becomes a first high resolution feature map (for example, the resolution is 128×128 pixels). This process is a simple upsampling process. Then, after going through convolutional network 404 and activation function 405 (for example, an LReLU function), the first high resolution feature map becomes a first low resolution feature map of 64×64 pixels. Subtraction operation 406 is performed on the first low resolution feature map and low resolution feature map 401 to obtain a second low resolution feature map of 64×64 pixels. Then, after going through deconvolutional network 407 and activation function 408 (for example, an LReLU function), the second low resolution feature map becomes a second high resolution feature map of 128×128 pixels. Then, a third high resolution feature map of 128×128 pixels is obtained through 1×1 convolutional network 409. Then, addition operation 410 is performed on the third high resolution feature map and the first high resolution feature map to obtain high resolution feature map 411 of 128×128 pixels.

Figure 4B:
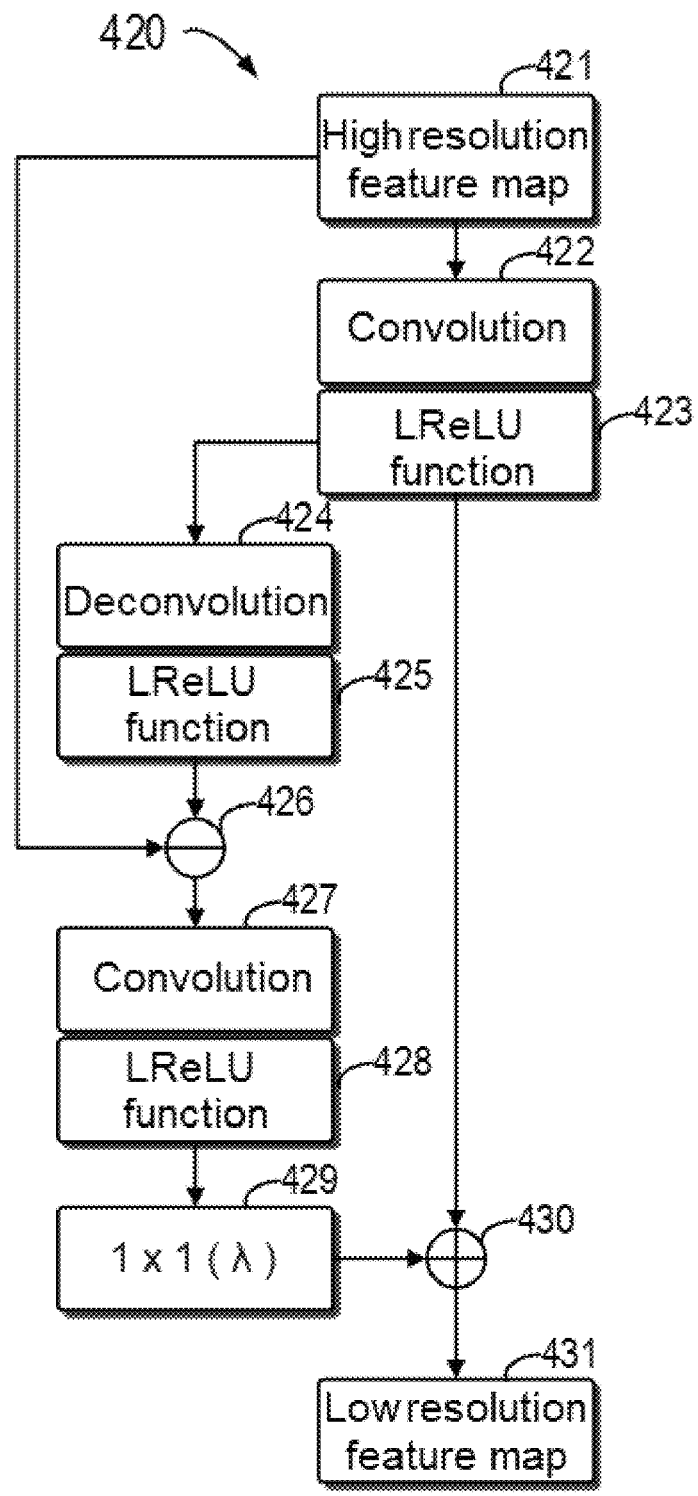

Similar to the algorithm structure of the enhanced sampling back projection block, FIG. 4B is a diagram 420 of a schematic algorithm structure of an enhanced downsampling back projection block according to some embodiments of the present disclosure. As shown in FIG. 4B, the enhanced downsampling back projection block receives high resolution feature map 421 (for example, the resolution is 128×128 pixels). After going through convolutional network 422 and activation function 423 (for example, an LReLU function), high resolution feature map 421 is reduced and becomes a first low resolution feature map (for example, the resolution is 64×64 pixels). This process is a simple downsampling process. Then, after going through deconvolutional network 424 and activation function 425 (for example, an LReLU function), the first low resolution feature map becomes a first high resolution feature map of 128×128 pixels. Subtraction operation 426 is performed on the first high resolution feature map and high resolution feature map 421 to obtain a second high resolution feature map of 128×128 pixels. Then, after going through convolutional network 427 and activation function 428 (for example, an LReLU function), the second high resolution feature map becomes a second low resolution feature map of 64×64 pixels. Then, a third low resolution feature map of 64×64 pixels is obtained through 1×1 convolutional network 429. Then, addition operation 430 is performed on the third low resolution feature map and the first low resolution feature map to obtain low resolution feature map 431 of 64×64 pixels.

Different from up-sampling and down-sampling in which the back projection mechanism is not used, such up-sampling and down-sampling in which the back projection mechanism is used realizes reuse of features and alleviates the problem of gradient disappearance, thereby effectively improving an effect of image reconstruction.

Figure 5A:
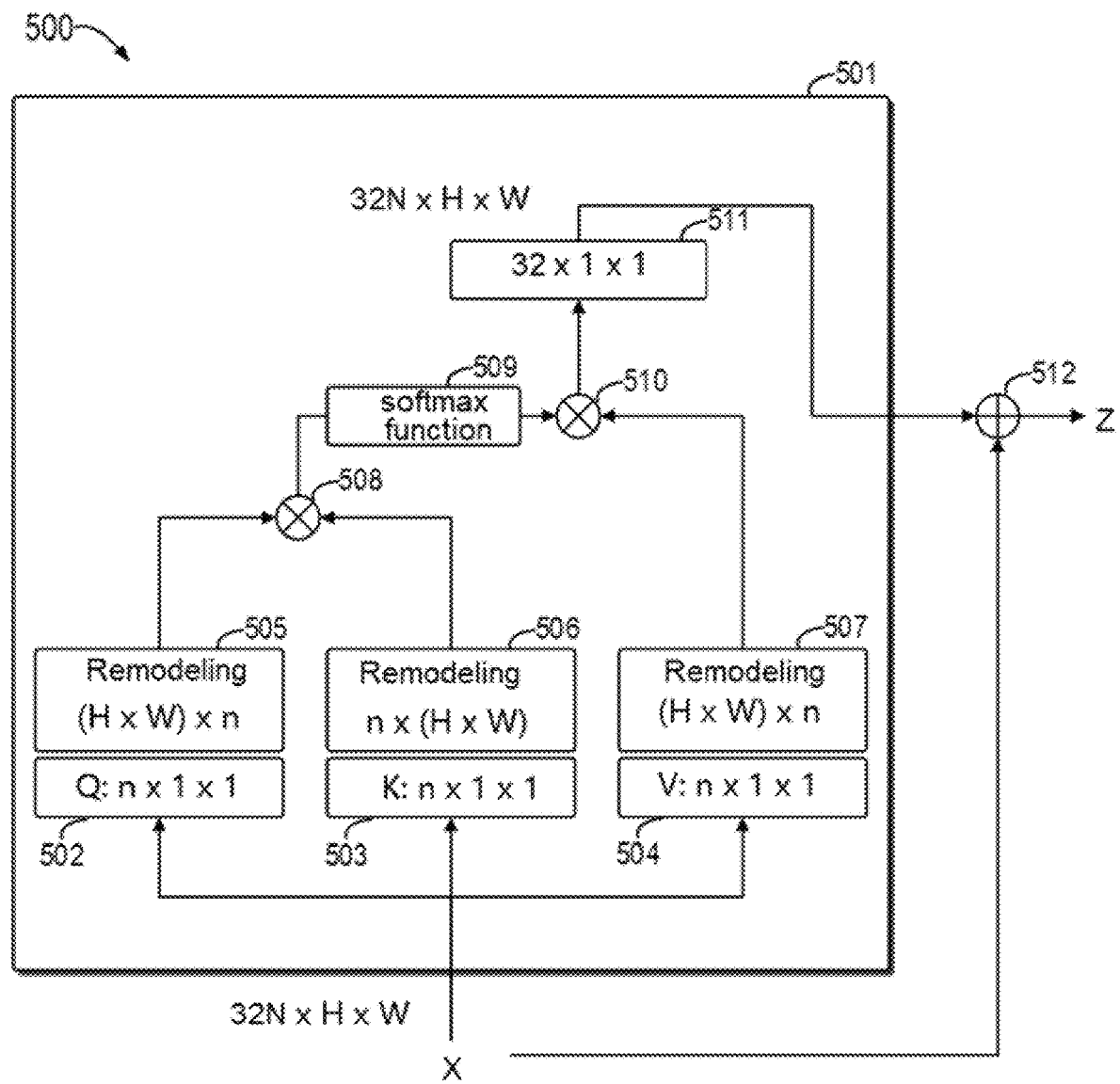
FIGS. 5A, 5B and 5C are diagrams of schematic algorithm structures of a spatial attention block, a bottom-up attention block, and a top-down attention block according to some embodiments of the present disclosure.

FIG. 5A is a diagram 500 of a schematic algorithm structure of a spatial attention block 501 according to some embodiments of the present disclosure. The spatial attention block 501 is a single-head attention network for image super-resolution, whose purpose is to find a short-term interrelation between two feature maps with the same resolution. As shown in FIG. 5A, the spatial attention block 501 receives X as input, where X represents a first feature map set of 32N×H×W, 32N represents the number of feature maps, H represents a height of the feature maps, and W represents a width of the feature maps. X goes through three convolutional networks 502, 503, and 504, respectively, also denoted as Q, K and V, respectively. In the three convolutional networks, 1×1 represents a 1×1 convolutional network, n represents the number of custom feature maps, and n<32N (which means that the 32N feature maps are compressed). Then, remodeling operations (remodeling operation 505, remodeling operation 506, and remodeling operation 507) are performed on outputs of the three convolutional networks to adjust the outputs into two-dimensional matrices with one dimension of H×W and the other dimension of n. It is to be noted that the outputs of remodeling operation 505 and remodeling operation 507 are two-dimensional matrices of (H×W)×n, while the output of remodeling 506 is a transposed matrix of n×(H×W) thereof. Cross product operation 508 is performed on the two-dimensional matrices obtained by remodeling operation 505 and remodeling operation 506, and then softmax function 509 is calculated. Cross product operation 510 is then performed on a value of a calculation result and the two-dimensional matrix outputted by remodeling operation 507. A result of cross product operation 510 then goes through 32×1×1 convolutional network 511 to obtain a second feature map set whose scale is rescaled to 32N×H×W. Addition operation 512 is performed on the second feature map set and X to obtain attention-adjusted result Z.

Such an RDBP network has various advantages. The back projection mechanism enables an execution result of each iteration to be affected by residuals generated in each previous block, which realizes information sharing, makes full use of the result generated by each block in the network, fully mines hidden information behind each pixel, alleviates the problem of gradient disappearance, and makes it more helpful to use a deeper network for image processing. At the same time, the attention mechanism solves the problem that, as the number of iterations increases, the depth of the network becomes deeper, and time complexity of execution of a deep learning network may also increase. The attention mechanism allocates attention to the most important pixels and features, which greatly reduces an amount of computation of each iteration, so that the problem of performance caused by the deepening of the network can be prevented while the number of iterations is increased to pursue high quality.

Referring back to FIG. 2, at block 206, computing device 106 may generate a feature map of the second resolution and a feature map of the first resolution through a second RDBP network, the first RDBP network and the second RDBP network respectively including a downsampling back projection layer, an upsampling back projection layer, and an attention layer. For example, as shown in FIG. 3A, the second RDBP network receives the high resolution feature map generated by the first RDBP network, and the process of the first RDBP network is repeated, so as to further improve the quality of the high resolution feature map generated and continuously reduce the error between the high resolution feature map and a real high resolution feature map.

In some embodiments, a process of generating the high solution feature map and the low resolution feature map through an RDBP network can be iteratively performed multiple times. Due to the use of the back projection mechanism and the attention mechanism in the RDBP network, a plurality of RDBP networks can be superimposed to improve quality of a high resolution feature map finally generated, without the need to worry too much about a poor final result caused by a computation speed and a great network depth of the network. As shown in FIG. 3A, RDBP network 314-1 represents the first RDBP network, RDBP network 314-2 represents the second RDBP network, and RDBP network 314-N represents that N RDBP networks can be executed iteratively. The more the RDBP networks are superimposed, the higher the quality of the generated high resolution feature map is.

Still referring to FIG. 2, at block 208, an output image of the second resolution is generated based on the feature maps of the second resolution and the feature maps of the first resolution generated through the first RDBP network and the second RDBP network. In FIG. 3A, a low resolution feature map and a high resolution feature map generated by each RDBP in RDBP network group 316 are received corresponding to cross-scale attention block 318. The low resolution feature map is a low resolution feature map obtained through the final spatial attention block in the RDBP network, for example, a low resolution feature map obtained through spatial attention block 360 in the embodiment shown in FIG. 3C, and the high resolution feature map is a high resolution feature map obtained through the final convolution block in the RDBP network, such as a high resolution feature map obtained through convolution block 364 in the embodiment shown in FIG. 3C. Back projection block 320 receives a high resolution feature map and a low resolution feature map generated by cross-scale attention block 318. High resolution output image 322 can be generated by learning a relationship between the high resolution feature map and the low resolution feature map and applying the relationship to an original low resolution input image.

FIG. 3D is a schematic diagram of an internal algorithm structure of a cross-scale attention block. The cross-scale attention block is a multi-head attention network, whose purpose is to explore long-term interrelationships among feature maps spanning different scales. The cross-scale attention block includes bottom-up attention block 378 and top-down attention block 380. Bottom-up attention block 378 generates a high resolution feature map with attention adjusted across scales by performing weighting on a high resolution feature map outputted by enhanced upsampling back projection block 372 and a low resolution feature map set outputted by enhanced downsampling back projection block 374. Top-down attention block 380 generates a low resolution feature map with attention adjusted across scales by performing weighting on a high resolution feature map set outputted by enhanced upsampling back projection block 370 and a low resolution feature map outputted by enhanced downsampling back projection block 376. The above process will be described in detail below with reference to FIG. 5B and FIG. 5C.

Figure 5B:
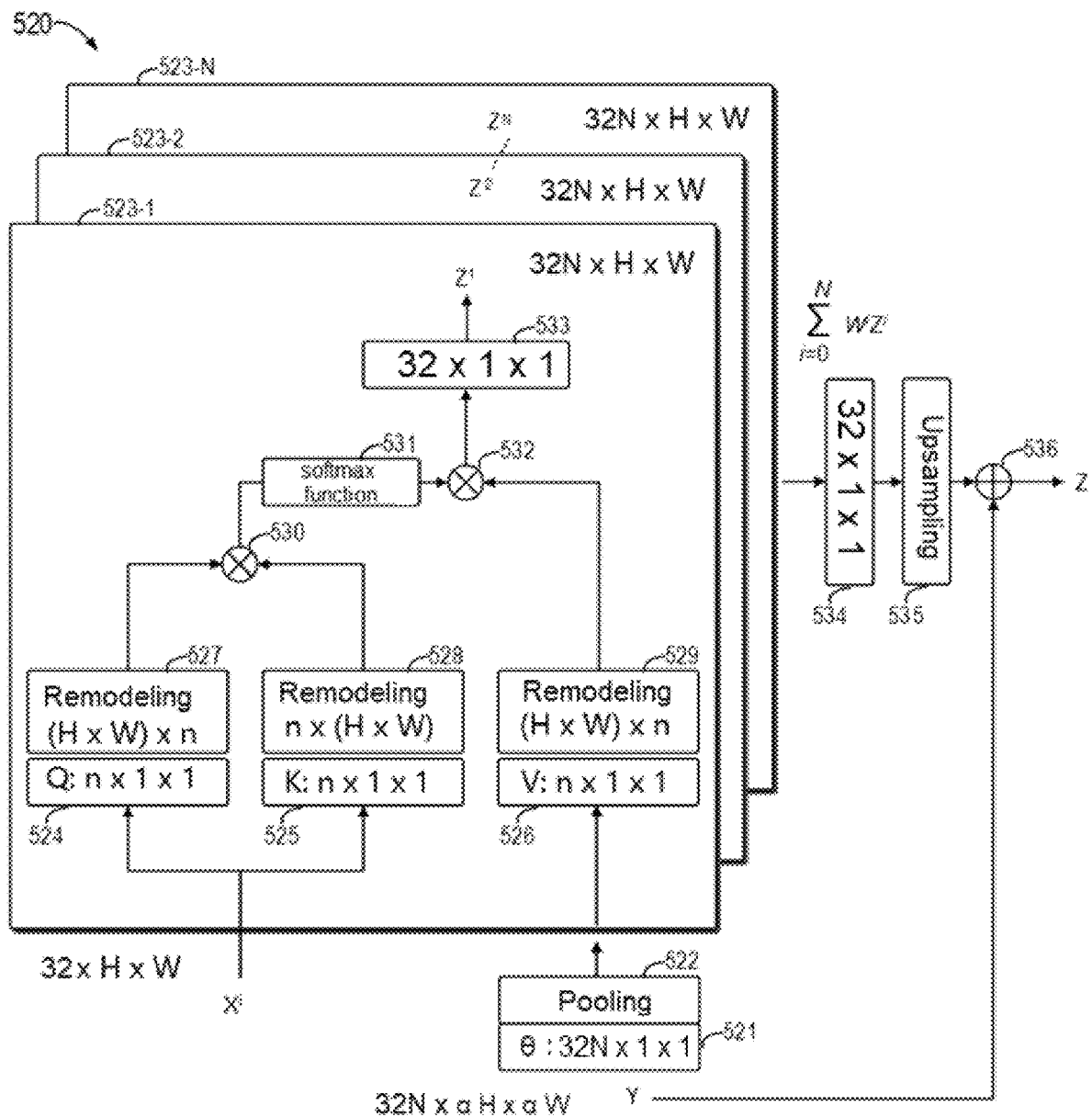

FIG. 5B is a diagram of a schematic algorithm structure of a bottom-up attention block. Bottom-up attention block 520 receives $X^i$ and Y as input, where $X^i$ denotes a 32×H×W first feature map set, and Y denotes a 32N×αH×αW second feature map set. α represents a scale of enlargement. That is, $X^i$ represents a low resolution feature map, and Y represents a high resolution feature map. Y sequentially goes through convolutional network 521 and pooling operation 522 to dimensionally reduce Y from a scale of αH×αW to a third feature map set of a scale of H×W. Then, a 32N scale of the third feature map set is split into modules 523-1, 523-2, ..., and 523-N. In each module, $X^i$ goes through convolutional network 524 and convolutional network 525 respectively. Then, remodeling operation 527 is performed on an output of convolutional network 524 to obtain a first two-dimensional matrix, and remodeling operation 528 is performed on an output of convolutional network 525 to obtain a second two-dimensional matrix. On the other hand, after the third feature map set is split, each feature map goes through convolutional network 526 and remodeling operation 529 to obtain a third two-dimensional matrix. Cross product operation 530 is performed on the first two-dimensional matrix and the second two-dimensional matrix, and then softmax function 531 is calculated. Cross product operation 532 is then performed on a value of a calculation result and the third two-dimensional matrix. A result of cross product operation 532 then goes through convolutional network 533 to obtain feature map set $Z^1$ whose scale is rescaled to 32N×H×W. The same operation is performed on the N modules to obtain $Z^1, Z^2, \ldots,$ and $Z^N$, which are weighted and accumulated and then made to go through convolutional network 534 and upsampling 535 to obtain a feature map enlarged back to a scale of αH×αW. The feature map is then added with Y to obtain an output feature map from the bottom-up attention block.

Figure 5C:
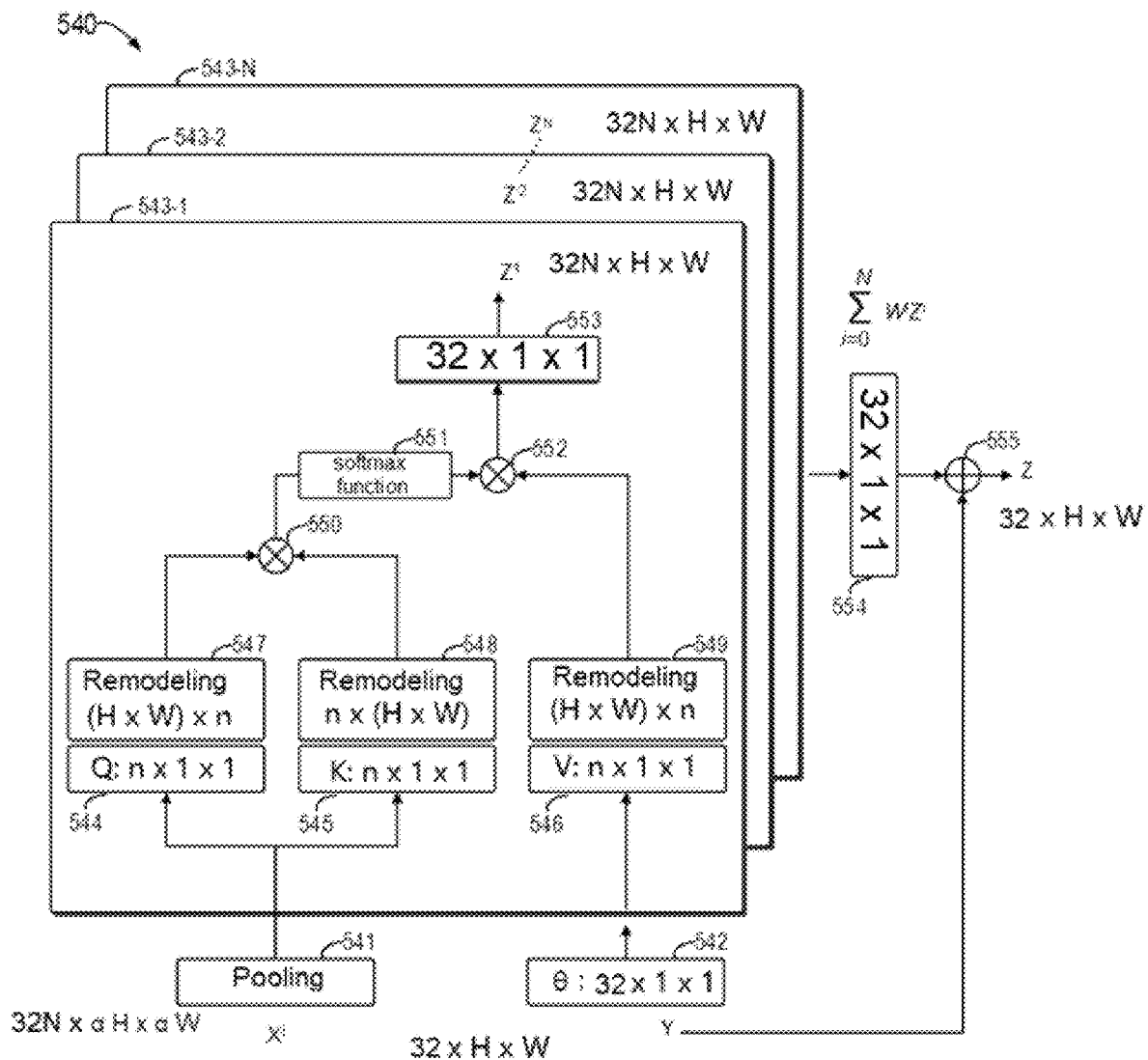

FIG. 5C is a diagram of a schematic algorithm structure of a top-down attention block. Top-down attention block 540 receives $X^i$ and Y as input, where $X^i$ denotes a 32× αH× αW first feature map set, Y denotes a 32×H×W second feature map set, and α represents a scale of enlargement. That is, $X^i$ represents a high resolution feature map, and Y represents a low resolution feature map. $X^i$ goes through pooling operation 541 to dimensionally reduce $X^i$ from a scale of αH×αW to a third feature map set of a scale of H×W. Then, a 32N scale of the third feature map set is split into modules 543-1, 543-2, ..., and 543-N. In each module, each feature map after the splitting goes through convolutional network 544 and convolutional network 545 respectively. Then, remodeling operation 547 is performed on an output of convolutional network 544 to obtain a first two-dimensional matrix, and remodeling operation 548 is performed on an output of convolutional network 545 to obtain a second two-dimensional matrix. On the other hand, Y sequentially goes through convolutional network 542, convolutional network 546, and remodeling operation 549 to obtain a third two-dimensional matrix. Cross product operation 550 is performed on the first two-dimensional matrix and the second two-dimensional matrix, and then softmax function 551 is calculated. Cross product operation 552 is then performed on a value of a calculation result and the third two-dimensional matrix. A result of cross product operation 552 then goes through convolutional network 553 to obtain feature map set $Z^1$ whose scale is rescaled to 32N×H×W. The same operation is performed on the N modules to obtain $Z^1, Z^2, \ldots,$ and $Z^N$, which are weighted and accumulated and then made to go through convolutional network 554 to obtain a feature map of a scale of H×W. The feature map is then added 555 with Y to obtain an output feature map from the top-down attention block.

The cross-scale attention block connects features of different network layers together and assigns different heads thereto to compute attention weights. A global projection matrix is used to project the heads onto a final output. Equation (2) below is a mathematical expression of the cross-scale attention block:

$$\text{Multihead }(X, Y) = Y + W_s\left(\underset{i \in N_h}{concat}[H^{(i)}]W^O\right) \quad (2)$$

$$H^{(i)} = \text{Attention}(\phi(X^i)W_Q, \phi(X^i)W_K, \theta(Y)W_V)$$

where θ(Y) is downsampling of Y, and $X^i$, i=1, 2, ..., N, denotes a feature map from an $i^{th}$ layer. A computation amount of pair-wise computation can be reduced by performing pooling operation θ in a spatial domain. Also, φ denotes a weighted parameter for each head $X^i$, and $W_s$ denotes a weighted parameter for an additional residual.

In some embodiments, in order to perform efficient image super-resolution, a convolutional layer and a deconvolutional layer with 32 kernels may be used in a deep attention network described herein. For short connectivity and attention models, a convolutional layer with a 1×1 kernel having a stride and a padding of 1 may be used. For the enhanced downsampling back projection block and the enhanced upsampling back projection block, a convolutional layer and a deconvolutional layer with 6×6 kernels having a stride of 4 and a padding of 1 may be used for 4× super resolution, and a convolutional layer and a deconvolutional layer with 10×10 kernels having a stride of 8 and a padding of 1 may be used for 8× super resolution. A convolutional layer and a deconvolutional layer with 64 kernels are used in most super-resolution methods. However, in this embodiment, only half of the convolutional kernels may be used to build a network. Benefiting from the use of the attention block, the performance of the network and the quality of the generated image in this embodiment are improved.

Figure 6:
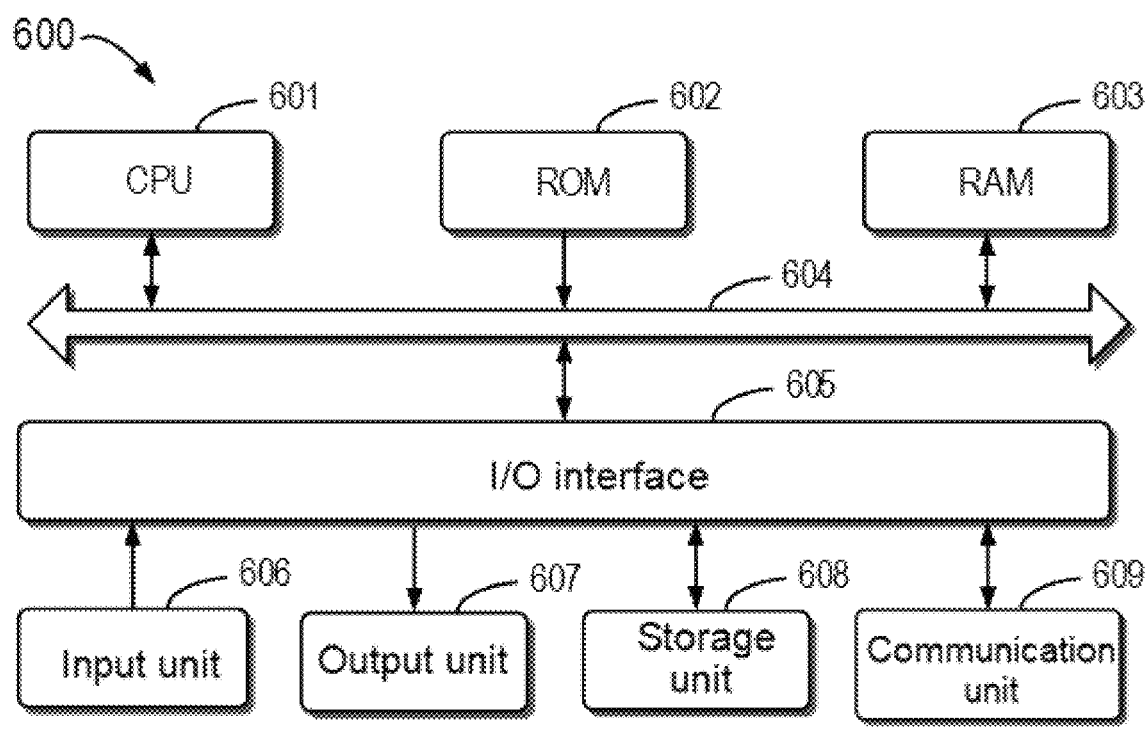
FIG. 6 is a block diagram of a device that can implement a plurality of embodiments of the present disclosure.

FIG. 6 is a schematic block diagram of example device 600 that may be used to implement embodiments of the present disclosure. Device 600 may be configured to implement computing device 106 or electronic device 108 in FIG. 1. As shown in the figure, device 600 includes computing unit 601 that may execute various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. Computing unit 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

Computing unit 601 may be various general-purpose and/or special-purpose processing components with processing and computing capabilities. Some examples of computing unit 601 include, but are not limited to, a central processing unit (CPU), a graphics processing unit (GPU), various dedicated artificial intelligence (AI) computing chips, various computing units for operating machine learning model algorithms, a digital signal processor (DSP), and any suitable processor, controller, micro-controller, and the like. Computing unit 601 performs various methods and processes described above, such as method 200. For example, in some embodiments, method 200 may be implemented as a computer software program that is tangibly included in a machine-readable medium, such as storage unit 608. In some embodiments, part of or all the computer program may be loaded and/or installed onto device 600 via ROM 602 and/or communication unit 609. When the computer program is loaded to RAM 603 and executed by computing unit 601, one or more steps of method 200 described above may be performed. Alternatively, in other embodiments, computing unit 601 may be configured to implement method 200 in any other suitable manners (such as by means of firmware).

The functions described herein may be performed, at least in part, by one or a plurality of hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code can be completely executed on a machine, partially executed on a machine, partially executed on a machine as an independent software package and partially executed on a remote machine, or completely executed on a remote machine or a server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disk read-only memory (CD-ROM), an optical storage device, a magnetic storage device, or any suitable combinations thereof. Additionally, although operations are depicted in a particular order, this should not be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

What is claimed is:

1. A method for image processing, comprising:
   for an input image of a first resolution, generating a feature map of a second resolution, the first resolution being less than the second resolution;
   processing the feature map of the second resolution through a processing pipeline comprising at least a first residual-based dense back projection (RDBP) network, a second RDBP network, and a cross-scale attention layer, the first RDBP network and the second RDBP network each comprising a downsampling back projection layer, an upsampling back projection layer, and a spatial attention layer, the first and second RDBP networks being configured to generate respective instances of the feature map of the second resolution and respective corresponding instances of a feature map of the first resolution, for processing by the cross-scale attention layer of the processing pipeline, the cross-scale attention layer comprising a multi-head attention block including a bottom-up attention block and a top-down attention block, the bottom-up attention block and the top-down attention block generating respective feature maps of respective different resolutions with attention adjusted across scales by processing outputs of different ones of the downsampling back projection layers and the upsampling back projection layers of the first and second RDBP networks; and generating, utilizing the cross-scale attention layer of the processing pipeline, an output image of the second resolution based on the feature maps of the second resolution and the feature maps of the first resolution generated through the first RDBP network and the second RDBP network.

2. The method according to claim 1, wherein generating a feature map of a second resolution for an input image of a first resolution comprises:

performing convolving and weighting on the input image to extract the feature map of the first resolution; and upsampling the feature map of the first resolution to obtain the feature map of the second resolution.

3. The method according to claim 1, wherein generating a feature map of the second resolution and a feature map of the first resolution through a first RDBP network comprises:

downsampling the feature map of the second resolution to obtain an initial downsampled feature map;

upsampling and downsampling the initial downsampled feature map to generate a first upsampled feature map and a first downsampled feature map; and performing weighting on the initial downsampled feature map and the first downsampled feature map to generate a first adjusted feature map.

4. The method according to claim 3, wherein generating a feature map of the second resolution and a feature map of the first resolution through a first RDBP network further comprises:

upsampling and downsampling the first adjusted feature map to generate a second upsampled feature map and a second downsampled feature map; and performing weighting on the initial downsampled feature map, the first downsampled feature map, and the second downsampled feature map to generate a second adjusted feature map.

5. The method according to claim 4, wherein generating a feature map of the second resolution and a feature map of the first resolution through a first RDBP network further comprises:

upsampling the second adjusted feature map to generate a third upsampled feature map;

convolving the first upsampled feature map, the second upsampled feature map, and the third upsampled feature map to generate an attention-adjusted feature map; and determining the attention-adjusted feature map to be the feature map of the second resolution, and determining the second adjusted feature map to be the feature map of the first resolution.

6. The method according to claim 2, wherein the upsampling comprises:

deconvolving and convolving the feature map of the first resolution to obtain a convolved feature map; and generating the feature map of the second resolution based on the feature map of the first resolution and the convolved feature map.

7. The method according to claim 3, wherein the downsampling comprises:

convolving and deconvolving the feature map of the second resolution to obtain a deconvolved feature map; and generating the feature map of the first resolution based on the feature map of the second resolution and the deconvolved feature map.

8. The method according to claim 5, further comprising:

iteratively performing a process of generating the second adjusted feature map prior to generating the third upsampled feature map.

9. The method according to claim 1, further comprising:

iteratively performing a process of generating the feature map of the second resolution and the feature map of the first resolution through an RDBP network multiple times.

10. The method according to claim 1, wherein generating an output image of the second resolution comprises:

connecting a plurality of feature maps of the second resolution generated through the first RDBP network and the second RDBP network together to generate a feature map set of the second resolution; and connecting a plurality of feature maps of the first resolution generated through the first RDBP network and the second RDBP network together to generate a feature map set of the first resolution.

11. The method according to claim 10, wherein generating an output image of the second resolution further comprises:

performing first weighting on the feature map set of the second resolution and the feature map set of the first resolution to generate a feature map of the second resolution with attention adjusted across scales; and performing second weighting on the feature map set of the second resolution and the feature map set of the first resolution to generate a feature map of the first resolution with attention adjusted across scales.

12. The method according to claim 11, wherein generating an output image of the second resolution further comprises:

generating the output image of the second resolution based on the feature map of the second resolution with attention adjusted across scales, the feature map of the first resolution with attention adjusted across scales, and the input image of the first resolution.

13. An electronic device, comprising:

at least one processor; and memory coupled to the at least one processor and having instructions stored thereon, wherein the instructions, when executed by the at least one processor, cause the electronic device to perform actions comprising:

for an input image of a first resolution, generating a feature map of a second resolution, the first resolution being less than the second resolution;

processing the feature map of the second resolution through a processing pipeline comprising at least a first residual-based dense back projection (RDBP) network, a second RDBP network, and a cross-scale attention layer, the first RDBP network and the second RDBP network each comprising a downsampling back projection layer, an upsampling back projection layer, and a spatial attention layer, the first and second RDBP networks being configured to generate respective instances of the feature map of the second resolution and respective corresponding instances of a feature map of the first resolution, for processing by the cross-scale attention layer of the processing pipeline, the cross-scale attention layer comprising a multi-head attention block including a bottom-up attention block and a top-down attention block, the bottom-up attention block and the top-down attention block generating respective feature maps of respective different resolutions with attention adjusted across scales by processing outputs of different ones of the downsampling back projection layers and the upsampling back projection layers of the first and second RDBP networks; and generating, utilizing the cross-scale attention layer of the processing pipeline, an output image of the second resolution based on the feature maps of the second resolution and the feature maps of the first resolution generated through the first RDBP network and the second RDBP network.

14. The electronic device according to claim 13, wherein generating a feature map of a second resolution for an input image of a first resolution comprises:

performing convolving and weighting on the input image to extract the feature map of the first resolution; and upsampling the feature map of the first resolution to obtain the feature map of the second resolution.

15. The electronic device according to claim 13, wherein generating a feature map of the second resolution and a feature map of the first resolution through a first RDBP network comprises:

downsampling the feature map of the second resolution to obtain an initial downsampled feature map;

upsampling and downsampling the initial downsampled feature map to generate a first upsampled feature map and a first downsampled feature map; and performing weighting on the initial downsampled feature map and the first downsampled feature map to generate a first adjusted feature map.

16. The electronic device according to claim 15, wherein generating a feature map of the second resolution and a feature map of the first resolution through a first RDBP network further comprises:

upsampling and downsampling the first adjusted feature map to generate a second upsampled feature map and a second downsampled feature map; and performing weighting on the initial downsampled feature map, the first downsampled feature map, and the second downsampled feature map to generate a second adjusted feature map.

17. The electronic device according to claim 16, wherein generating a feature map of the second resolution and a feature map of the first resolution through a first RDBP network further comprises:

upsampling the second adjusted feature map to generate a third upsampled feature map;

convolving the first upsampled feature map, the second upsampled feature map, and the third upsampled feature map to generate an attention-adjusted feature map; and determining the attention-adjusted feature map to be the feature map of the second resolution, and determining the second adjusted feature map to be the feature map of the first resolution.

18. The electronic device according to claim 14, wherein the upsampling comprises:

deconvolving and convolving the feature map of the first resolution to obtain a convolved feature map; and generating the feature map of the second resolution based on the feature map of the first resolution and the convolved feature map.

19. The electronic device according to claim 15, wherein the downsampling comprises:

convolving and deconvolving the feature map of the second resolution to obtain a deconvolved feature map; and generating the feature map of the first resolution based on the feature map of the second resolution and the deconvolved feature map.

20. A computer program product that is tangibly stored on a non-transitory computer-readable medium and comprises machine-executable instructions, wherein the machine-executable instructions, when executed by a machine, cause the machine to perform actions comprising:

for an input image of a first resolution, generating a feature map of a second resolution, the first resolution being less than the second resolution;

processing the feature map of the second resolution through a processing pipeline comprising at least a first residual-based dense back projection (RDBP) network, a second RDBP network, and a cross-scale attention layer, the first RDBP network and the second RDBP network each comprising a downsampling back projection layer, an upsampling back projection layer, and a spatial attention layer, the first and second RDBP networks being configured to generate respective instances of the feature map of the second resolution and respective corresponding instances of a feature map of the first resolution, for processing by the cross-scale attention layer of the processing pipeline, the cross-scale attention layer comprising a multi-head attention block including a bottom-up attention block and a top-down attention block, the bottom-up attention block and the top-down attention block generating respective feature maps of respective different resolutions with attention adjusted across scales by processing outputs of different ones of the downsampling back projection layers and the upsampling back projection layers of the first and second RDBP networks; and generating, utilizing the cross-scale attention layer of the processing pipeline, an output image of the second resolution based on the feature maps of the second resolution and the feature maps of the first resolution generated through the first RDBP network and the second RDBP network.

\* \* \* \* \*